United States Patent [19]

Byers et al.

[11] Patent Number: 5,025,543
[45] Date of Patent: Jun. 25, 1991

[54] METHOD OF PREPARING A SUPPORT MECHANISM FOR VEHICLE SIDE VIEW MIRROR

[75] Inventors: Timothy W. Byers; Gary L. Byers, both of Whitefish, Mont.

[73] Assignee: Creative Sales & Mfg. Co., Inc., Whitefish, Mont.

[21] Appl. No.: 547,504

[22] Filed: Jul. 2, 1990

Related U.S. Application Data

[63] Continuation-in-part of Ser. No. 328,839, Mar. 27, 1989, abandoned.

[51] Int. Cl.$^5$ .................... B21K 21/16; G02B 5/08
[52] U.S. Cl. .................... 29/401.1; 29/402.03; 29/426.4; 350/604; 350/639; 248/480
[58] Field of Search ............ 29/401.1, 402.3, 402.8, 29/426.4; 350/604, 631, 632, 639; 248/298, 475.1, 476, 480; 403/154, 326, 375

[56] References Cited

U.S. PATENT DOCUMENTS

| | | | |
|---|---|---|---|
| 4,165,156 | 8/1979 | O'Connell | 350/307 |
| 4,451,021 | 5/1984 | Merris | 248/480 |
| 4,711,538 | 12/1987 | Ohs et al. | 350/604 |
| 4,730,913 | 3/1988 | Boothe | 350/604 |
| 4,753,410 | 6/1988 | Dyer | 248/480 |
| 4,815,836 | 3/1989 | Byers et al. | 350/604 |

*Primary Examiner*—Joseph M. Gorski
*Assistant Examiner*—S. Thomas Hughes
*Attorney, Agent, or Firm*—George M. Cole

[57] ABSTRACT

Method for preparing an adjustable side view mirror mounting mechanism (40,50,70) for vehicles which includes a conventional mounting support (14) supporting neck (12) and mirror (M). After the neck (12) is cut a desired distance above base (14) the neck stub (23) left on base (14) is removed and a replacement sleeve (70) is substituted. A slidable mirror support block (50) has a slot (64) through which is received bar (40) and which has lock means (56) for securing and releasing the block for slidable movement with respect to the bar. On the top of the block means (50) is a support cavity (55) to receive the shortened neck (12) for supporting the mirror (M). The mounting bar (40) with block (50) is attached to the upper end of sleeve (70) to complete the installation.

3 Claims, 2 Drawing Sheets

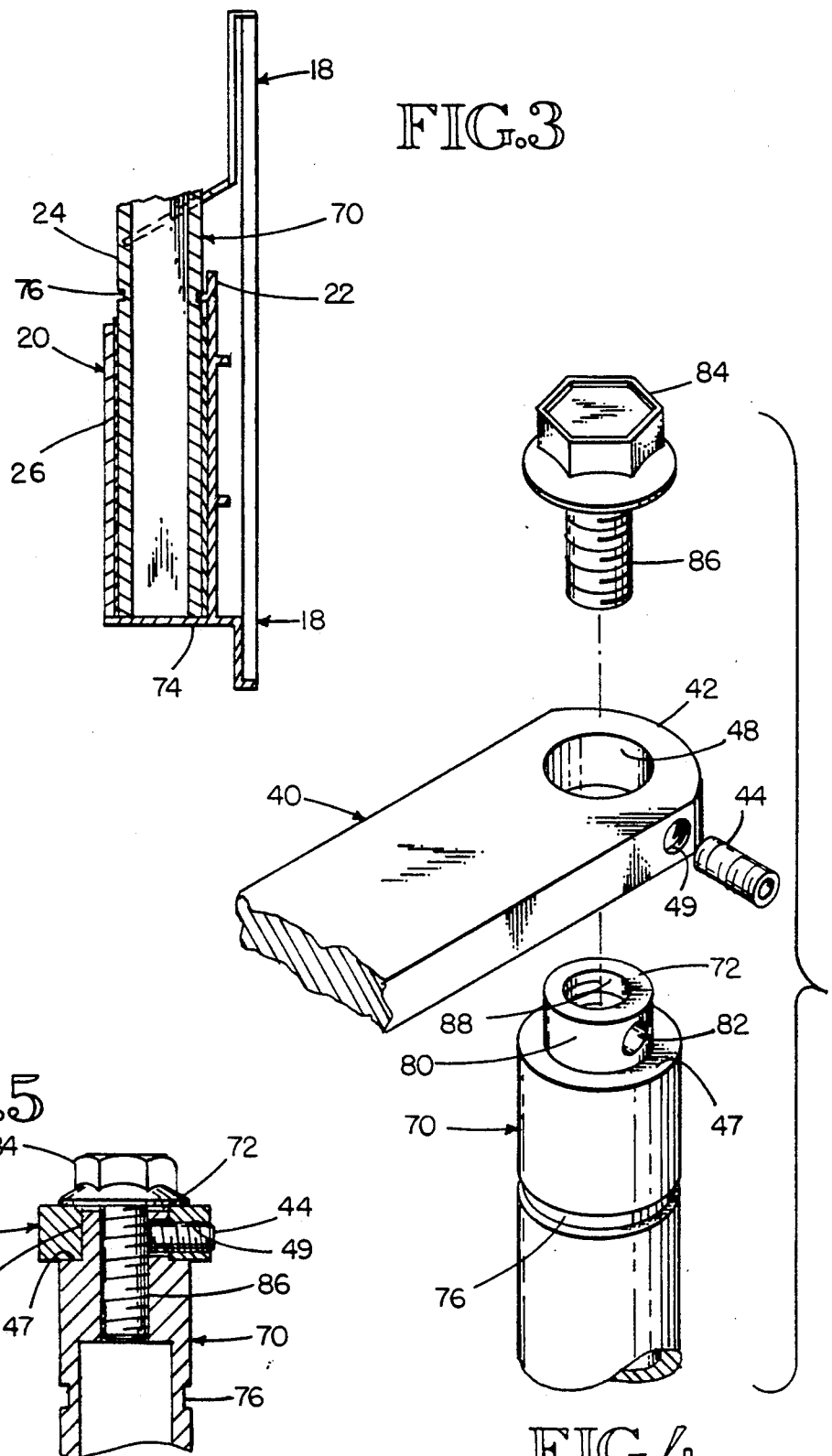

METHOD OF PREPARING A SUPPORT MECHANISM FOR VEHICLE SIDE VIEW MIRROR

This is a continuation-in-part of Ser. No. 328,839, filed Mar. 27, 1989, now abandoned.

TECHNICAL FIELD

The invention relates generally to the field of side mounted, outside mirrors for cars and trucks, and more particularly to a method for preparing the mounting mechanism for a side mounted mirror support which is movable horizontally between an extended and a retracted position.

BACKGROUND ART

As operators are aware, vehicles used for carrying loads and towing, whether they be automobiles, pick-up trucks, vans or the like, frequently have a conventional side view mirror which does not enable the driver to see to the rear. This is particularly so where, for instance, an extra wide tow or load is involved such as a boat trailer, trailer home, camping trailer or high and wide load of whatever nature. Campers on the beds of pick-up trucks are another example. These loads are most often not only wide but long and the standard side mounted mirror simply does not permit an adequate line of vision to the rear of the load or tow. In addition there is the problem of blurring caused by vibration of the mirror on its mounting.

One solution with which many drivers are familiar is the extended mirror mounting frame which holds the mirror far enough away from the side of the vehicle so that the driver can observe to the rear of his load or tow. Typically, the extra wide or extended mirror mounts are a three point support frame structure attached to the outside of each front door panel. Unlike many if not most conventional mirror mounts which are rotatable or can fold back, the three point support frame is fixed. If the rotatable mount is accidentally struck, it will collapse or fold back without damage to itself or to the door panel. On the other hand, if a rigid three point extended mirror frame is hit substantial damage can be done to the door panel and/or to the mounting frame itself.

One solution is to change back to the conventional mirror mount when the vehicle is not being used to carry a load or to tow. However, changing mirror mounts is time consuming, tedious and frustrating.

The broad concept of a laterally adjustable mirror, from a first position near the door window to an outer or extended second position to establish a line of vision rearwardly of a load or tow, is old. In U.S. Pat. No. 4,165,156 to O'Connell a fold back mounting frame bracket is used together with a pivot arm for the mirror. The structure allows the mirror to be at a conventional distance from the driver's window. It also allows the driver to pivot the mirror to an outer position thus enabling him or her to see behind a load or tow.

Another structure for horizontal outward adjustment of a vehicle mirror is found in U.S. Pat. No. 4,111,532 which is a temporary or substitute mirror mounted on the existing side view mirror. Structural principles of such a device are significantly different from the device of this invention.

In U.S. Pat. No. 4,558,930 to Deedreek an outwardly extendible mirror is provided by a motor driven rack and pinion. The mirror itself is also pivotable with an electric motor driven set of gears. Again, the structure is unrelated in principle or design to the instant device.

U.S. Pat. No. 4,247,173 to Vitalone shows another structurally unrelated system for extending and retracting an outside rear view mirror. British Patent Specification 499,802 shows a very complicated and prohibitively expensive structure for laterally extending and retracting a mirror but it is not pertinent to the invention herein. U.S. Pat. No. 4,451,021 to Merriss shows a simple slotted slide bar which is secured by a bolt to the upper part of the door panel bracket. Again, however, it is not material to the invention herein.

U.S. Pat. No. 4,711,538 shows an entirely different method of supporting the slidable and adjustable mirror mount which is similar to but distinct from the invention of this application. U.S. Pat. Nos. 4,315,614 and 3,048,084 are of interest but structurally and functionally completely different from the instant device.

SUMMARY OF THE INVENTION

The invention comprises a structure which utilizes an existing door panel mirror mounting frame or support. One type of door panel mounted support includes a curved or arcuate neck part which neck is cut as by hacksaw a predetermined distance above the top of the support. The upwardly extending stub is provided with an adapter arm in which is mounted a slidable mirror mounting block. The slidably adjustable block has a slot therein by which it is received on the adapter arm. A cavity on the upper surface of the block receives the mirror support neck by being inserted in the cavity and then tightened in position. Alternatively the block can be made in two parts and installed on the upper horizontal bar portion of an existing bracket.

Accordingly, it is among the many features of the invention to provide a horizontally adjustable and repositionable exterior side view mirror support structure which is uniquely simple, inexpensive, rugged and durable. The mirror support device allows the vehicle owner to utilize the existing mounting means such that the mirror itself is disconnected from the original support and replaced on the support structure of this invention. No special tools are required to install the device and it is not necessary to drill any holes. The block can be mounted on an adapter arm or on the upper horizontal portion of a support frame. The invention is designed to be tamper proof and retains the advantage of using the original mirror support structure mounted on the door panel.

BRIEF DESCRIPTION OF THE DRAWINGS

FIG. 3 is a view in cross section showing the replacement sleeve in position in the support base after the neck stub is removed.

FIG. 4 is an exploded view in perspective of the manner in which the adpater arm is secured to the replacement sleeve, and FIG. 5 is a partial elevation view in cross section showing additional details for mounting the adapter bar.

BEST MODE FOR CARRYING OUT THE INVENTION

Figure 1:
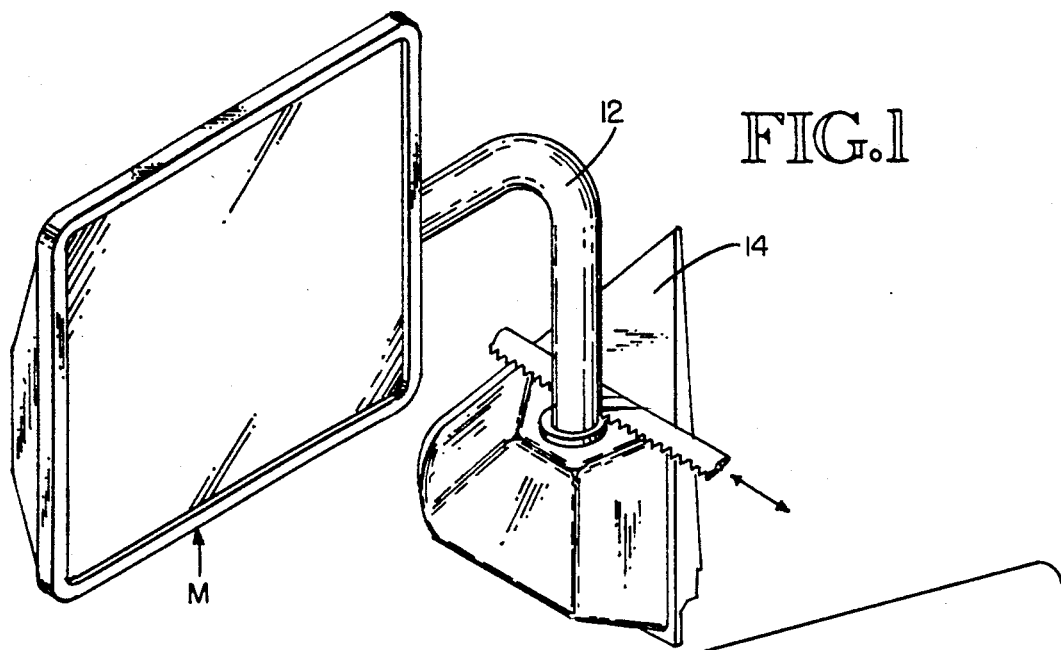
FIG. 1 is a view in perspective showing a standard type of door panel mounting structure for an exterior mirror.

Referring now to the drawings it will be seen that FIG. 1 represents a standard type of side view mirror mount for a vehicle such as a Chevrolet pick-up truck or van. In this regard see co-pending U.S. patent application Ser. No. 128,056 filed Dec. 3, 1987. Mirror M is connected by curved tubular support neck member 12 to the mounting base 14 attached to the door panel. The support base 14 itself, reference being made to FIGS. 2 and 3 of the drawings, show that the original neck 12 extends downwardly into the support base where it is securely held in place.

Support 14, which forms no part of the invention herein, is original equipment by the manufacturer as discussed in copending Application Ser. No. 128,056. Support 14 has a removable cover 16 and a mounting base 18 attached to the vehicle door. The mounting base 14 includes a mounting structure 20 having a roughly semicircular cradle member 22 which includes a retainer ridge 24. A clamp part 26 has two detent extensions (not shown) along one edge which are inserted into the cradle structure 20. The other edge of the clamp part 26 has a flat lip 28 which is secured to the cradle structure by bolts 30.

To install the invention of this application the neck support 12 is cut a predetermined distance, such as ⅜ inch, above the support level as by hacksaw or the like so that a stub 23 is left in support 14. Because of variations in diameter of the necks 12 it has been found desirous to remove the stub 23 by removing the cover 16 and loosening the clamp portion 26 in the manner now to be described.

Figure 2:
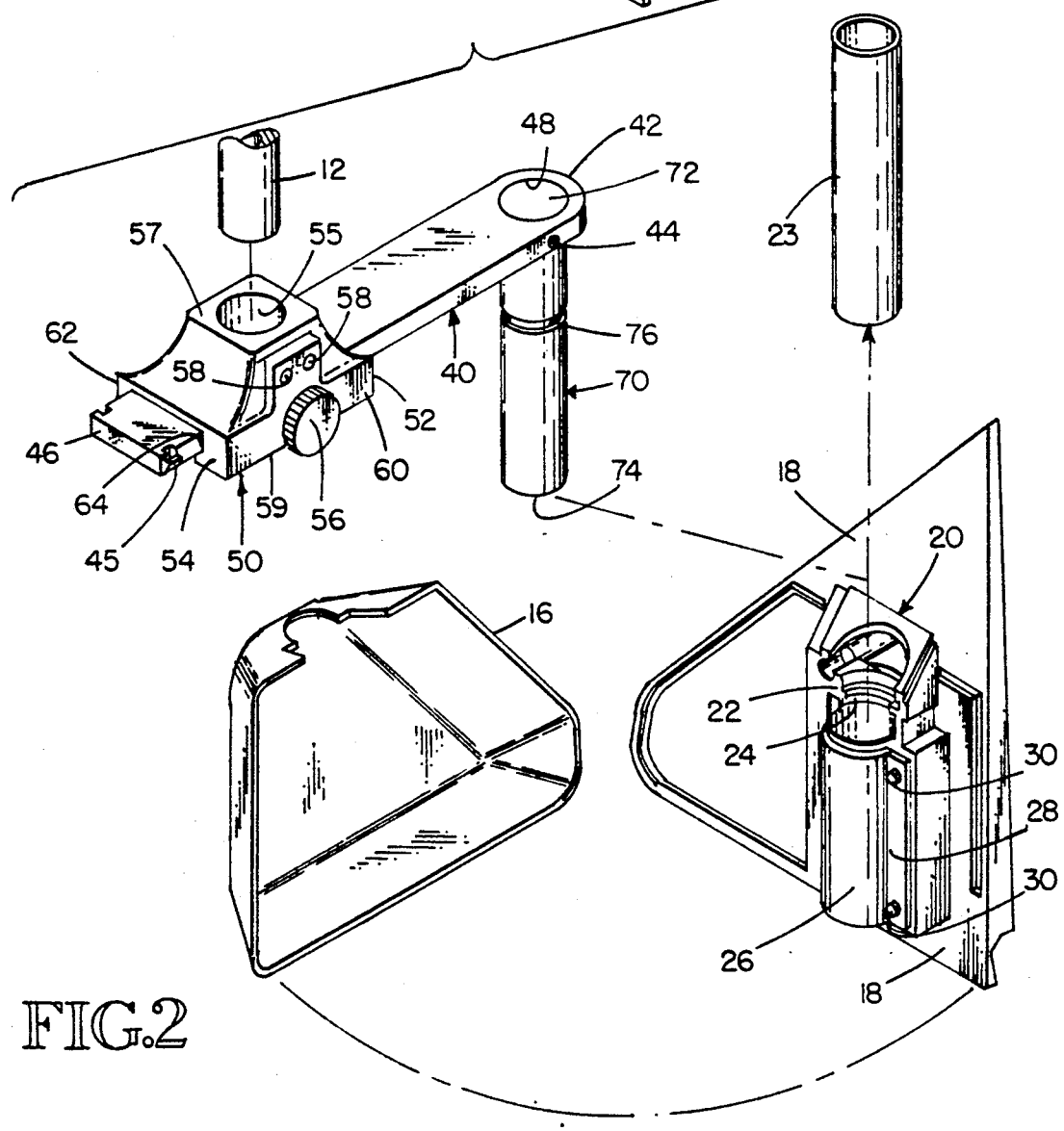
FIG. 2 is a view in perspective of the mirror of FIG. 1 removed by cutting through the curved neck and then substituting for the neck stub a replacement sleeve.

An adapter support bar, generally designated by the number 40, and as can best be seen in FIG. 2, is an elongated rectangular bar approximately ¼ inch thick by approximately 6 inches in length and about 1 inch in width. Bar 40 has inner end 42 and outer end 46 and near inner end 42 is provided with a round opening 48. Bar 40 has at least one recessed lock screw 44 which in our copending application was for the purpose of securing bar 40 to stub 23.

An adjustable mirror mounting block, generally designated by the number 50, is generally rectangular having inner and outer ends 52 and 54 respectively, top surface 57, bottom surface 59, and front and rear sides 60 and 62 respectively. Top surface 57 is generally planar and includes opening 55 therein which extends downwardly to a bottom cavity surface to receive the arcuate or curved neck support member 12. Recessed lock screws 58 are received in threaded holes from each side surface 60 and 62 or from front side surface 60 as shown to hold neck 12 rigidly in position in the opening 55. Below the opening 55 in the body of block 50 is a slot 64 to receive adapter bar 40. It will be appreciated that an adjustment screw 56 extends into the block from the rear side edge 60 of the block to engage the bar. The adjustment screw 66 has a knurled finger knob so that the screw can be released easily and the block 50 moved to its desired location on the bar. Stop means 45 are provided at the outer end of bar 40 so that block 50 cannot be slidably removed from the bar.

As mentioned above the cradle structure of the support base includes a retainer ridge 24. In place of the stub 23, a tubular replacement sleeve 70 of predetermined length and diameter is provided. It has an upper end 72, a lower end 74 and is of a consistent diameter and wall thickness so that groove 76 can be formed therein to coincide with retainer ridge 24 so that the entire mirror mounting assembly cannot be pulled out except by dismantling the support base 14. Once the replacement sleeve is substituted for the stub 23, the clamp is resecured and the cover 16 placed back in position. Then the arm 40 can be mounted, the neck support 12 inserted and secured to block 50 and the adjustable mirror mount is in place. It will be appreciated that the entire neck may be removed from the support base before it is cut and then the cut made according to dimensions needed.

Referring to FIGS. 4 and 5 of the drawings it will be seen that a preferred manner of mounting adapter 40 is illustrated. The opening 48 in bar 40 is received on the inwardly offset ledge 47 of sleeve 70 and lock screw 44 is received in the in the threaded recess 49. It will be noted that lock screw 44 extends through the bar 40 and through threaded passage 49 and through opening 82 in mounting section 80. A bolt 84 with shank 86 is received in threaded hole 88 to assist in holding the adapter bar 40 firmly in place and free of vibration. Removal or loosening of bolt 84 is prevented by threading lock screw 44 securely against the threads of bolt shank 86.

We claim:

1. A method of preparing a support mechanism of a side mounted rear view mirror assembly for vehicles having a mirror, mirror neck and mirror neck support base, said support base having a retainer cradle assembly and releasable clamp means for holding said mirror neck in said retainer cradle assembly, said retainer cradle assembly also including an inwardly extending ridge means for engaging a coacting groove in said mirror neck, the improvement comprising the steps of:

(a) cutting said mirror neck at a predetermined location thereby creating a stub portion of predetermined length in said support base and a portion which is attached to said mirror, (b) substituting for said stub portion in said support base a replacement sleeve of predetermined length having an annular groove therein to coact with said ridge means in said cradle assembly, said replacement sleeve having a predetermined portion thereof extending above the top surface of said support base, and (c) securing a mirror support bar with movable support block means thereon to said replacement sleeve, and further securing that portion of said mirror neck attached to said mirror to said support block.

2. The method according to claim 1, wherein said cutting step comprises removing the mirror and mirror neck from said support base prior to cutting said mirror neck at said predetermined location.

3. The method according to claim 1, wherein said cutting step comprises removing said stub portion from said support base subsequent to cutting said mirror neck at said predetermined location.

* * * * *